United States Patent [19]
Hayashi et al.

[11] Patent Number: 5,504,307
[45] Date of Patent: Apr. 2, 1996

[54] HEAT TRANSFER MATERIAL FOR HEATING AND HEATING UNIT AND HEATING APPARATUS USING SAME MATERIAL

[75] Inventors: Tadamasa Hayashi; Jyunichi Yamaji; Toyoshi Mizushima; Syuichi Ueno; Toshiyuki Koya; Takashi Ohtu, all of Tokyo; Masashi Fukuhara, Kanagawa, all of Japan

[73] Assignee: Ebara Corporation, Tokyo, Japan

[21] Appl. No.: 253,214

[22] Filed: Jun. 2, 1994

Related U.S. Application Data

[63] Continuation of Ser. No. 728,129, Jul. 10, 1991, abandoned.

[30] Foreign Application Priority Data

Jul. 13, 1990 [JP] Japan ................................. 2-184159
Jun. 20, 1991 [JP] Japan ................................. 3-174720

[51] Int. Cl.⁶ ............................... H05B 3/16; H05B 3/58
[52] U.S. Cl. ...................... 219/543; 219/535; 392/485
[58] Field of Search ................................. 219/543, 469, 219/549, 535; 338/308, 309, 217; 392/485, 480

[56] References Cited

U.S. PATENT DOCUMENTS

| | | | |
|---|---|---|---|
| 1,870,619 | 8/1932 | Flanzer | 219/543 |
| 3,374,338 | 3/1968 | Morey | 219/549 |
| 3,378,673 | 4/1968 | Hopper | 219/543 |
| 3,791,863 | 2/1974 | Quirk | 219/543 |
| 3,811,934 | 5/1974 | Glaser | 219/543 |
| 3,851,150 | 11/1974 | Von Holzen | 219/553 |
| 3,852,566 | 12/1974 | Quirk | 219/543 |
| 3,872,419 | 3/1975 | Groves et al. | 338/308 |
| 4,587,402 | 5/1986 | Nishino et al. | 338/308 |
| 4,724,305 | 2/1988 | Iimura et al. | 219/543 |
| 4,809,771 | 3/1989 | Kennel et al. | 165/10 |
| 4,931,625 | 6/1990 | Marlinski | 219/528 |
| 5,081,341 | 1/1992 | Rowe | 219/505 |
| 5,138,426 | 8/1992 | Umeda | 357/67 |

FOREIGN PATENT DOCUMENTS

| | | | |
|---|---|---|---|
| 2246152 | 12/1973 | France | 219/543 |
| 1-27755 | 5/1989 | Japan. | |
| 2-179860 | 7/1990 | Japan. | |

OTHER PUBLICATIONS

Japanese Patent Public Disclosure No. 154478/84.
Japanese Patent Public Disclosure No. 94394/84.
Japanese Utility Model Public Disclosure No. 120597/83.
Ebara News vol. 15, No. 60.
Ebara News No. 88.
Ebara News No. 139.
Ebara News Special Issue on Chemical Engineering Machine.
Ebara News No. 97.
Ebara News No. 129.
Ebar News No. 123.
Derwent File Supplier WPIL Derwend Publications, London UK & JP-A-2113987 (Matsushita) *abstract*.
Derwent File Supplier WPIL Derwent Publications, London, UK & JP-A-63160885 (Sekisui) *abstract*.
Derwent File Supplier WPIL Derwent Publications, Longon, UK & JP-A-63139787 (Sekisui) *abstract*.
Derwent File Supplier WPIL Derwent Publications, London, UK & JP-A-63160887 (Sekisui) *abstract*.

*Primary Examiner*—Teresa J. Walberg
*Assistant Examiner*—Sam Paik
*Attorney, Agent, or Firm*—Wenderoth, Lind & Ponack

[57] ABSTRACT

A heat transfer material for heating and heating unit and heating apparatus using the same material, wherein the heat transfer material comprises a substrate 2 and an electrical insulating layer 4 as a first layer, an electrically conductive layer 5 entirely or partially provided as a second layer, and a heat insulating layer 6 as a third layer, all of which are formed in turn on the substrate 2, whereby a heat transfer material for heating which is capable of insulating a substance to be heated and highly heat efficiency uniformly heating and which has rapid thermal response is obtained.

12 Claims, 9 Drawing Sheets

HEAT TRANSFER MATERIAL FOR HEATING AND HEATING UNIT AND HEATING APPARATUS USING SAME MATERIAL

This application is a continuation of now abandoned application, Ser. No. 07/728,129, filed Jul. 10, 1991.

BACKGROUND OF THE INVENTION:

1. Field of the Invention

The present invention relates to a heat transfer material for heating, and particularly to a heat transfer material for heating comprising a plurality of thin layers provided on a metal or nonmetal substrate. The invention also relates to a heating unit and a heating apparatus, both of which use the same material.

2. Prior Art

In evaporation and heating apparatuses, a reliable supply of heat energy is important. In an evaporation apparatus, for example, water vapor generated by burning kerosene, fuel oil, coal or the like is used as heat energy However, such apparatuses generate $NO_x$, $SO_x$, $CO_2$ and the like and thus cause environmental pollution. Such apparatuses also have a defect in that a quantity of heat cannot be easily controlled because such apparatuses are complicated in construction and thus a complicated control system is needed therefore. There is thus the need for developing a clean and simple heating apparatus.

On the other hand, clean heat energy is provided by an electric heating method. For example, a fluid flowing in a metal pipe may be electrically heated by resistance heating using a sheathed type heater or the like. Although this method is simple, it has the disadvantage that it easily produces local heating. Namely, since good adhesion or contact of the sheathed heater to the metal pipe cannot be obtained, there is a problem that heat transfer is subject to high resistance. In addition, when a fluid flowing in a pipe is an electrically insulating substance such as fuel oil or the like, the metal pipe may be directly electrically charged so that the fluid is heated by a skin current effect. Although this method is highly efficient, it has the drawback that it cannot be applied to fluids of electrically conductive substances such as $Na_2SO_4$ aqueous solutions and the like.

On the other hand, in recent years, surface treatment techniques have been significantly developed, and various materials can be easily formed into thin films on a substrate by coating, thermal sprayed coating, CVD or physical evaporation, sputtering, ion plating or the like. A film thickness can also be changed within the range of 0.1 μm, to 3 mm according to the characteristics of the method used. A multilayer film can be produced by the use of the thin film techniques stated above.

A method for forming an electric resistance heating layer by the use of the thermal sprayed coating, for example, is shown in Japanese Utility Model Application Public Disclosure No. 120597/83, Japanese Patent Application Public Disclosure No. 94394/84 and Japanese Patent Application Public Disclosure No. 154478/84.

However, when the thin film is formed by the thermal sprayed coating, since the minimum size of the film thickness is determined by the size of spray particles, the film thickness is usually limited to 50 μm or more. Thus, the method is limited to a specific application.

SUMMARY OF THE INVENTION

It is therefore an object of the present invention to solve the above mentioned problems of the prior art electrical heating method and to provide a heat transfer material for heating and a heating unit and a heating apparatus, both of which use a material which is capable of providing substantially uniform heat and which exhibits low resistance to heat transfer and rapid thermal response without producing local heating.

In order to achieve the above object, the present invention provides a heat transfer material for heating which comprises an electrical insulating layer provided as a first layer, an electrically conductive layer entirely or partially provided as a second layer and a heat insulating layer provided as a third layer, all of which are formed in turn on a substrate.

Either a metal or nonmetal substrate can be used as the substrate, and a substrate having a shape such as a plate, pipe and the like can be used as far as the layers can be formed in turn on the outer surface of the substrate used. When a nonmetal substrate which is an electrical insulating material is used since the substrate can also serve as an electrical insulating layer as a first layer, the first layer need not be formed.

In the heat transfer material for heating, an electrically conductive layer may be entirely or partially provided as a primary coat between the substrate and the first layer, and an electromagnetic shield layer may be entirely or partially provided on any one of the substrate, the primary coat and the third layer.

It is preferable for the electrically conductive layer as the second layer to be a heating layer made of a mixture containing an electrically conductive material and an electrical insulating material and to have a thickness which changes in a lengthwise direction at the opposite end portions of the electrically conductive layer to obtain a uniform heating throughout the lengthwise of the conductive layer. Gradient coating layers respectively made of a mixture of the materials for the respective adjacent layers with different mixing ratios within the range of 0.1 to 99.9 wt % are preferably provided between the respective adjacent layers to relieve thermal stress between the layers. Of the above layers, when a layer is made of a porous material, it is preferably subjected to a sealing treatment using a substance including a heat-resistant resin, glass or ceramic to keep the insulation resistance constant.

If electrical charging terminals are fixed to the electrically conductive layer as the second layer in the heat transfer material of the present invention, a heating unit may be realized. Further, if a heat quantity control mechanism which controls the electricity charged is provided on the heating unit, the heating unit can be formed as a heating apparatus such as an autoclave, an evaporator, a heat exchanger, a calorifier or a pure water- or ultrapure water-producing apparatus.

Each of the layers of the present invention is preferably formed by a thin film method. Examples of thin film methods that can be used includes a coating method, a burning method, a thermal sprayed coating method, CVD and evaporation methods, a plasma method, an ion plating method and the like. In the present invention, each of the layers has a thickness of about 0.1 μm to 3 mm, and glass, ceramics, a polymeric material or the like can be used as a nonmetal substrate.

One of alumina, zirconium oxide, chromium oxide, titanium oxide, silica, magnesia, tungsten carbide and the like, a mixture thereof or a general glass material or plastic material can be used as the electrical insulating material. Examples of electrically conductive materials that can be used include metals such as copper, aluminum, nickel, chromium and the like; metal compounds thereof; heating elements such as molybdenum silicide and the like; semiconductors such as silicon carbide, tin oxide and the like; conductive coating agents and the like. Examples of electromagnetic shield materials that can be used include permeable materials such as silicon steel, ferrite, zinc, permalloy and the like. Examples of heat resistant resins that can be used include phenyl silicone, polyimide, phenolic resins, urethane resins, resins equivalent thereto and glass or ceramic containing substance, all of these materials are preferably subjected to sealing treatment.

In the present invention, since a plurality of coating layers such as an electrical insulating layer, an electrically conductive layer and so on are formed on the outer surface of the substrate, like a metal pipe, with good adhesion by a thin film method, the layers basically have a thickness of several mm, a low thermal resistance and good thermal responsiveness.

The heat transfer of the Joule heat generated by the heating layer made of an electrically conductive material in the layers is substantially determined by the inverse of the film heat transfer coefficient between fluids existing on the inside and outside of the heat transfer pipe, i.e., the surface heat resistivity on both sides of the pipe. When the fluid or liquid in the pipe is turbulent flow, since the surface heat resistivity on inside is 1/several thousands while that on outside is 1/several, thus the ratio between both sides is 1/100 or more. Thus, heat transfer mostly takes place into the fluid inside the pipe, and thus the invention has the function of obtaining a heat efficiency of about 99% in principle.

The fluid in the pipe may be a gas, liquid, solid or compound thereof.

In addition, if a metal is used as the electrically conductive material, the material has extremely low resistivity, and thus a large quantity of current flows through the material at a low voltage. Since electric resistance is inversely proportional to a cross sectional area, the current value can easily be adjusted to any desired value by the thin film method. Further, since a uniform face film can be formed, the present invention has the advantage of obtaining a uniform temperature with high accuracy.

When an electrical insulating material is mixed with an electrically conductive metal layer, it causes an apparent decrease in the cross sectional area of the metal layer which results in an increase in actual resistance.

Although an electromotive force is produced outside the heating unit due to electromagnetic induction when the heating unit is charged with electricity, this can be prevented by providing an electromagnetic shield effect with a zinc layer or the like on the heat insulating layer.

Since the multilayer coating has differences in thermal expansion coefficients between the materials therefor, there is a danger of the multilayer coating being separated by a heat cycle. However, when mixtures of the materials for adjacent layers with different mixing ratios are interposed therebetween, the function of relieving thermal stress is obtained.

When the heating unit is produced by the thermal sprayed coating method, the multilayer coat formed tends to become porous, and, if the coat is allowed to stand in air, particularly at high humidity, the coat absorbs water and thus exhibits poor insulation. In order to prevent such a phenomenon, the heat transfer pipe is subjected to sealing treatment using a resin or the like so that no water is absorbed thereby, and insulation can be maintained. This also causes an antioxidant function.

When the heat insulating layer as the third layer is formed of a ceramics, glass or resin by the thin film method, a layer mainly functions as an electrically insulating layer. In order to give a sufficiently high heat insulating function as well as electric insulating function to the third layer, it is preferable to constitute the layer with glass wool or gypsum of several centimeter thickness.

The present invention enables nonuse of a fuel oil tank, a steam generator, a steam drain recovering apparatus and piping and the like, all of which are provided in a prior art heating apparatus which employs steam. The invention simplifies a heating apparatus by using only an electric power source in place of the above mentioned apparatuses and thus, has the function of preventing environmental pollution. In addition, a heating apparatus of the invention has the function of saving energy, as compared with usual electrical heating apparatuses.

The above and other objects, features and advantages of the present invention will become more apparent from the following description when taken in conjunction with the accompanying drawings in which a preferred embodiment of the present invention is shown by way of illustrative examples.

DETAILED DESCRIPTION OF THE PREFERRED EMBODIMENTS

Although the present invention is described in detail below with reference to the specific embodiments, the present invention is not limited to these embodiments.

[Embodiment 1]

Figure 1:
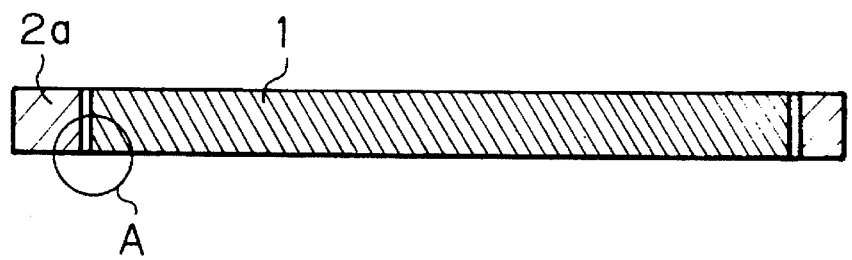
FIG. 1 is a total front view of a multilayer heat transfer pipe according to a first embodiment of the present invention.
Figure 2:
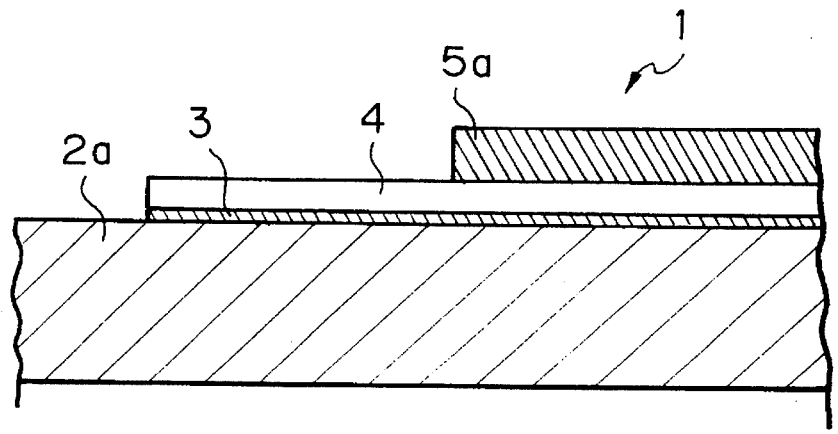
FIG. 2 is an enlarged sectional view of a section "A" of the heat transfer pipe shown in FIG. 1.

A heat transfer pipe according to a first embodiment of the present invention which is produced by a plasma spray coating method is shown in FIGS. 1 and 2. FIG. 1 is a total front view of the multilayer heat transfer pipe having several coats-formed by spray coating, and FIG. 2 is an enlarged sectional view of the portion "A" of the heat transfer pipe of FIG. 1.

In this embodiment, an NiAl alloy prime coat 3 having a thickness of 100 μm, a 100% alumina insulating layer 4 having a thickness of 500 μm and an NiCr electrically conductive heating layer 5a having a thickness of 800 μm were formed in turn over a length of 1 m on the outer surface of a stainless pipe 2a (SUS25A SCH10S) having a diameter of 34 mm and a thickness of 2.8 mm by using a usual plasma spray coating method, while rotating the stainless pipe 2a around its axis, to produce a laminate type heat transfer pipe. At the same time, a specimen was formed and measured with respect to adhesive force (JIS Standards). As a result, the average value was 2.0 Kg/mm$^2$ and it also exhibited a low degree of heat resistance.

[Embodiment 2]

Figure 3:
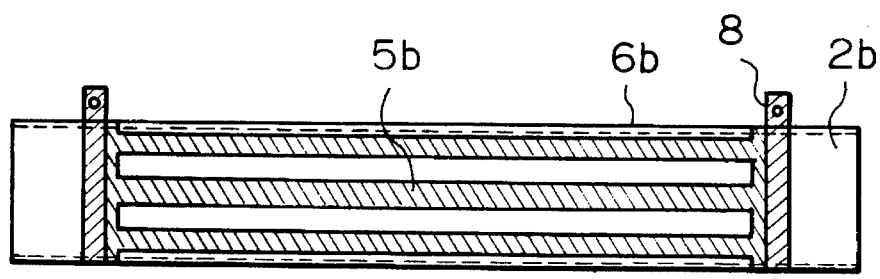
FIG. 3 is a total front view of a quartz heat transfer pipe provided with a heating unit according to a second embodiment of the present invention.

A heat transfer pipe according to a second embodiment of the present invention which was produced by coating and burning is shown in FIG. 3. Namely, FIG. 3 is a total front view of the heat transfer pipe in which a conductive thin film 5b and an insulating thin film 6b were partially provided in turn on a quartz pipe 2b, and electrical charging terminals 8 were fixed to the pipe.

Specifically, the quartz pipe 2b having a diameter of 20 mm and a thickness of 1.0 mm was masked with a tape and then immersed in a conductive solution mainly containing tin oxide. After 10 minutes had passed, the pipe was removed from the solution and then burnt in an electric furnace at 500° C. for 20 minutes. This operation was repeated five times to form a conductive coating 5b having a thickness of about 1 Mm. Then, an insulating silica coat 6b was applied to the coating film excepting the electrical charging terminal portions. The terminals 8 were then fixed to the coating 5b by a conductive adhesive to form the heat transfer pipe. The value of the insulating resistance between the silica coat 6b and the terminals 8 is indefinite.

[Embodiment 3]

0.5 to 0.73 kg of water was placed in each of the heat transfer pipe produced in Embodiment 1 to which copper plate terminals each having a thickness of 0.5 mm and a width of 50 mm were respectively fixed to upper and lower ends of the pipe, and the heat transfer pipe produced in Embodiment 2. As a result of batch heating experiment carried out by applying an electric power of 100 to 200 W to each pipe, water vapor could be easily obtained from both heat transfer pipes. Since no local heating occurred at the terminal portions, and since the resistance value of the NiCr film of each of the heat transfer pipes had a proportional relation to the length thereof, each of the pipes was uniformly heated. In addition, when a sheathed thermocouple having a diameter of 0.3 mm was buried in the inner thickness of SUS in order to measure the thermal response characteristics in a stepwise response manner, the time constant obtained was about 3 seconds on the assumption that the measurement system is a linear system.

[Embodiment 4]

Figure 4:
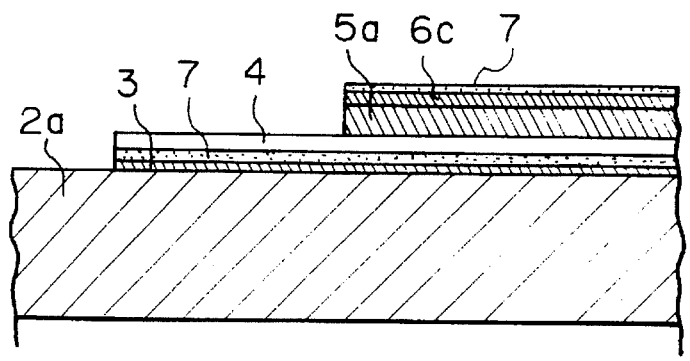
FIG. 4 is a partially enlarged sectional view of a heat transfer pipe provided with a shield layer according to a fourth embodiment of the present invention.

Zinc double electromagnetic shield layers 7 were provided in a multilayer coat formed by the same method as that employed in Embodiment 1. FIG. 4 shows a partially enlarged sectional view thereof. The induced electromotive force generated in a lead wire of 0.5 φ and 100 mm when applying an a.c. electric power of 1.2 V and 6 A to the pipe was measured at a distance of 5 mm from the outer surface of the pipe by using a synchroscope. As a result, the electromotive force was decreased by about 81%, i.e. from 0.16 m Vpp to 0.03 m Vpp, due to the presence of the electromagnetic shield layers 7.

[Embodiment 5]

Figure 5:
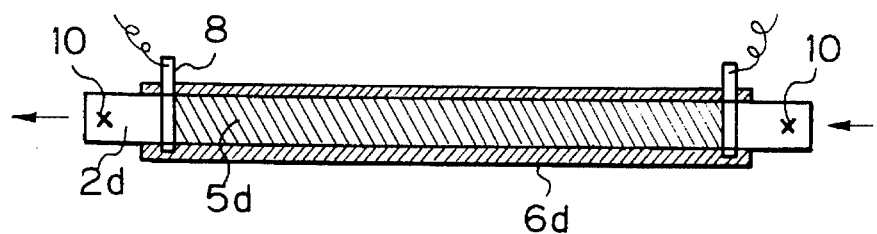
FIG. 5 is a partially sectioned front view of a heating unit comprising a vinyl chloride pipe and a heat transfer material provided thereon according to a fifth embodiment of the present invention.

As shown in FIG. 5, a conductive coating agent was coated on the outer surface of a 1 m vinyl chloride pipe 2d having an inner diameter of 24 mm and a thickness of 1.8 mm by using a brush and then dried. This process was repeated 5 times to form a heating layer 5d having a thickness of 3 mm and made of a material mixture. Electrical charging terminals 8 were then respectively fixed to the upper and lower ends of the pipe, and a heat insulating glass wool material 6 with thickness of 3 cm was wound on the heating layer to produce a heat transfer pipe. FIG. 5 shows the arrangement of the whole heat transfer pipe thus produced. Water was supplied at 2.00 m$^3$/h to the pipe, and electric power of 1.5 kW was applied thereto. As a result of measurement of a temperature difference of water between the inlet and outlet of the pipe by using a sheathed thermocouple 10 having a diameter of 0.3 mm, a temperature rise was 0.61° C. The thermal efficiency calculated on the basis of heat input and output was a high value of 95%.

[Embodiment 6]

Figure 6:
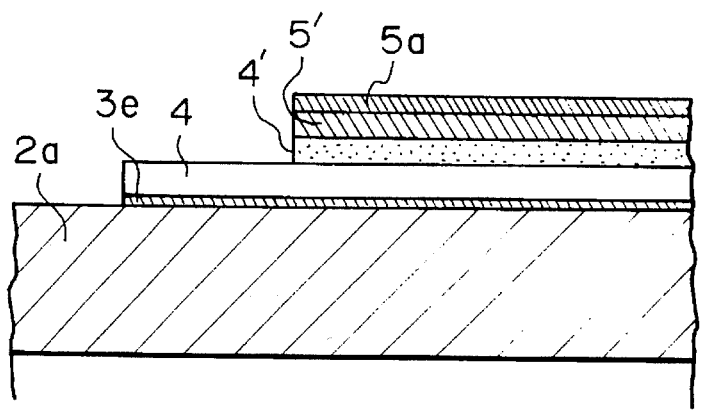
FIG. 6 is a partially enlarged sectional view of a heat transfer material having a gradient structure according to a sixth embodiment of the present invention.

As shown in FIG. 6, an NiCrAlY prime coat 3e having a thickness of 30 μm, a 100 wt % alumina insulating layer 4 having a thickness of 300 μm, a mixture 4' having a thickness of 100 μm containing alumina and NiCr at a ratio of 90:10 wt %, a mixture 5' having a thickness of 100 μm containing alumina and NiCr at a ratio of 10:90 wt % and a 100 wt % NiCr layer 5a having a thickness of 100 μm were formed in turn on the outer surface of the same stainless pipe 2a as that used in Embodiment 1 by a plasma spray coating method to produce a heat-transfer pipe comprising gradient coating layers. FIG. 6 is a sectional view of the arrangement of the thus produced pipe.

At the same time, a specimen having the same structure as that described above and a length of 15 cm was produced. As a result of 30 heat cycle experiments in each of which this specimen was heated in a muffle furnace at 500° C. for 1 hour and then allowed to cool, the occurrence of separation or cracks was not visually observed. When the electric insulation between the stainless pipe and the NiCr upper most layer of the pipe was measured by using an ohmmeter, insulation of about 8 MΩ was constantly maintained.

[Embodiment 7]

The film produced by the plasma spray coating thin film method is porous. If a heat transfer pipe having such a film, e.g., the pipe produced in Embodiment 1, is allowed to stand in air for a long time, particularly, at a high humidity of 50 to 100%, the insulation resistance decreases to about 4 kΩ and becomes unstable. When the pipe was dried at 150° C. for 1 hour, the insulation resistance recovered to about 10 MΩ. This was mainly caused by absorption of the water in air by the porous film.

On the other hand, when a phenylsilicone resin was coated on the film so that the pores of the film were completely sealed immediately after spray coating, the insulation resistance was not affected by the humidity in air and could be maintained at about 10 MΩ.

Even when the heat transfer pipe subjected to sealing treatment was heated in a muffle furnace at 300° C. for 50 hours, the insulation resistance was kept at about 10 MΩ.

[Embodiment 8]

Figure 7:
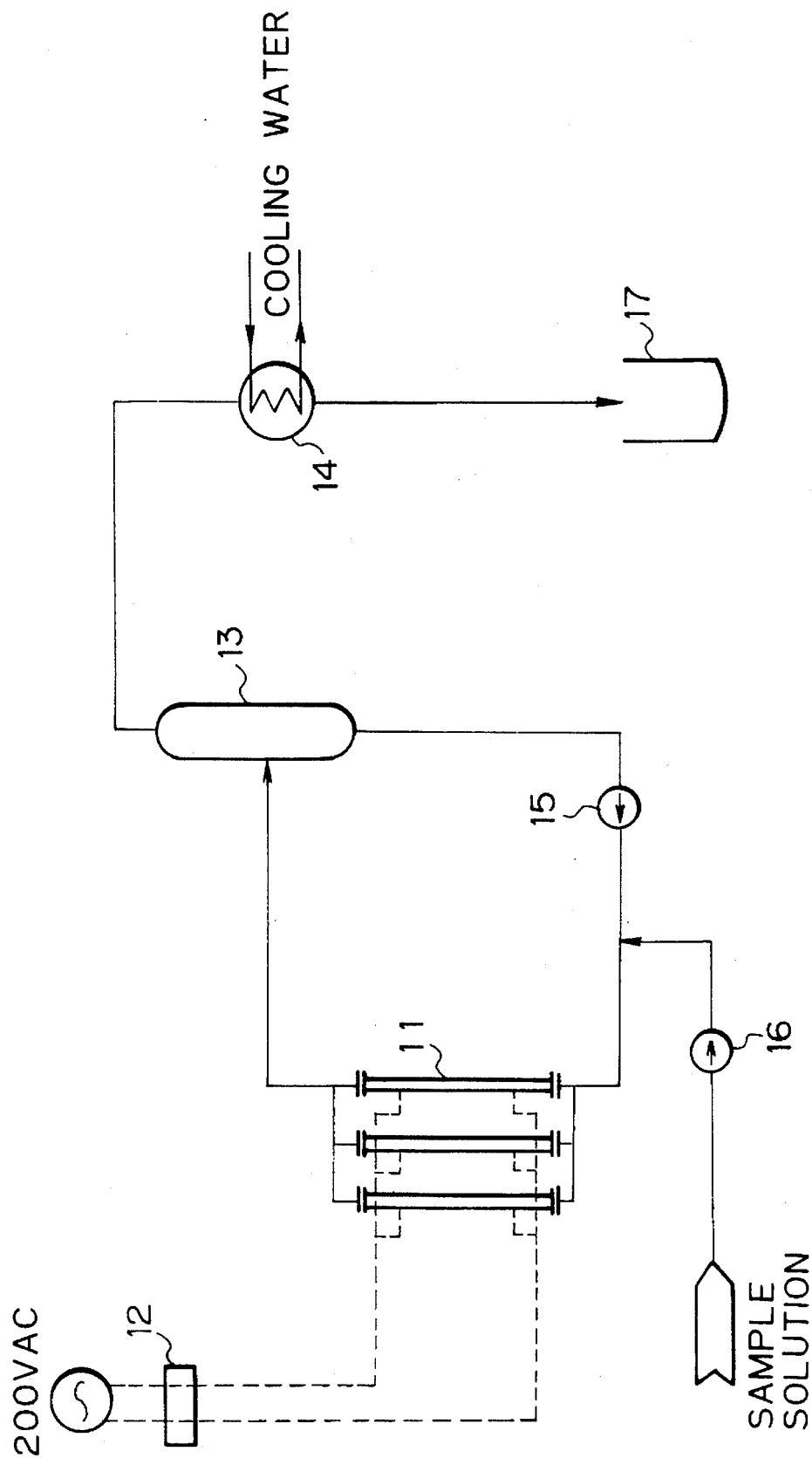
FIG. 7 is a diagram showing an arrangement of a continuous multiple evaporator according to an eighth invention of the present invention.

FIG. 7 is a diagram showing the arrangement of an example of continuous multi-pipe evaporator comprising heat transfer pipes of the invention.

The evaporation thickening apparatus shown in FIG. 7 mainly comprises a heat transfer pipe group 11, an electric power controller 12 for controlling the heat quantity thereof, a vapor body 13 for evaporating an aqueous solution, a condenser 14 for condensing vapor to water a circulating pump 15 for circulating the aqueous solution, and a supply unit 16 for supplying the aqueous solution. Three heat transfer pipes are provided in parallel, and the electric power can be adjusted to 0.1 to 30 KW. The flow rate in the pipes can be changed within the range of 0.05 to 5 m/s. When a sample solution was supplied at 20° C. and 28.5 l/h, and the apparatus was operated under the conditions that the heat transfer pipe heat flux was 4 W/cm$^2$, the flow rate in the pipes was 2.2 m/s, and the heat exchanger duty was 1.7×10$^4$ kcal/h, a total heat efficiency of 95% was obtained, and distilled water was obtained at 28 l/h in a tank 17. In this embodiment, industrial water was used as the aqueous solution.

[Embodiment 9]

Figure 8:
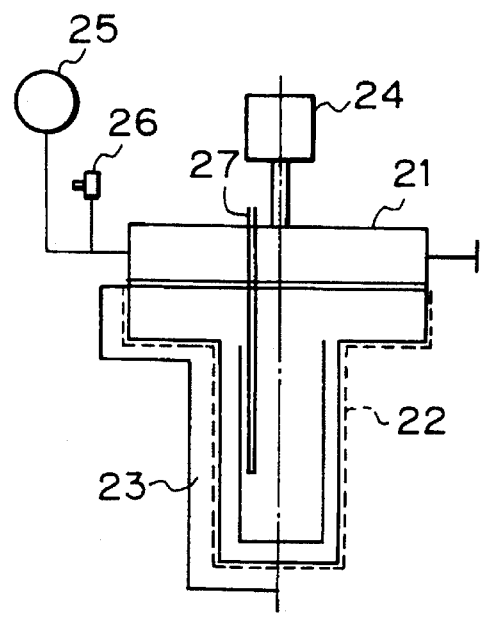
FIG. 8 is a diagram showing the arrangement of an autoclave according to a ninth embodiment of the present invention.

FIG. 8 is a diagram showing the arrangement of an autoclave which employs the heating unit of the present invention.

In FIG. 8, reference numeral 21 denotes an autoclave body; reference numeral 22, a heating unit; reference numeral 23, a heat insulating layer; reference numeral 24, an agitator; reference numeral 25, a pressure gauge; reference numeral 26, a safety valve; and reference numeral 27, a thermometer. The heating unit 22 comprises a prime coat layer (NiAl) of 0.05 mm, an insulating layer (Al$_2$O$_3$) of 0.3 mm and a heating layer (NiAl) of 0.25 mm, all of which are provided on the unit body.

The autoclave configured as described above can be heated only by electrically charging the heating layer. Since the heating source is provided integrally with the unit body, the whole apparatus is made compact. In addition, the heat efficiency is close to 100%, and the thermal responsibility and temperature controllability are significantly improved. The temperature is controlled by controlling the output from the heating unit (or controlling the current value to the heating unit) using the thermometer.

Such a structure can be applied to an agitation-type evaporator and the like other than the autoclave.

[Embodiment 10]

Figure 9:
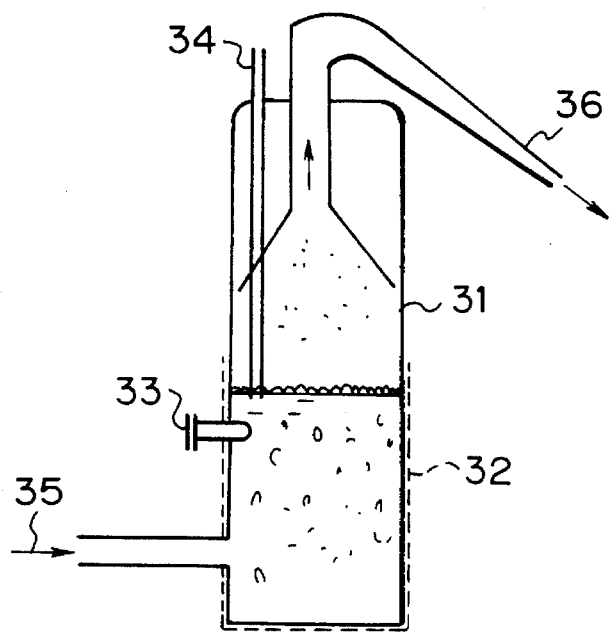
FIG. 9 is a diagram showing the arrangement of a distiller according to a tenth embodiment of the present invention.

FIG. 9 is a diagrammatic sectional view of a distiller in a pure-water producing apparatus to which the heating unit of the present invention is applied.

In FIG. 9, a stainless distiller 31 comprises a thin film heating unit 32 which is the same as that in the autoclave of Embodiment 9, a water supply inlet 35, and a vapor or distilled water outlet nozzle 36. A thermoswitch 33 for preventing heating without water and a level gauge 34 may also be provided for safety. The level gauge may comprise a float switch or may be an electric capacity type or a type wherein the temperature of the outer surface of the film is detected so that a level is determined directly from the position where the temperature abruptly changes. The level control by the level gauge is linked to continuous or intermittent water supply.

If desired, the thin film heating unit may be provided in a water supply line.

The distiller of this embodiment exhibits good responsibility and has no heat pipe passing therethrough and thus a simple structure and excellent safety can be obtained. The material for the body of the distiller may be either a metal or glass, and quartz is preferable as a glass material.

The same structure as that described above can be applied to a water bath simply for heating a liquid.

[Embodiment 11]

Figure 10:
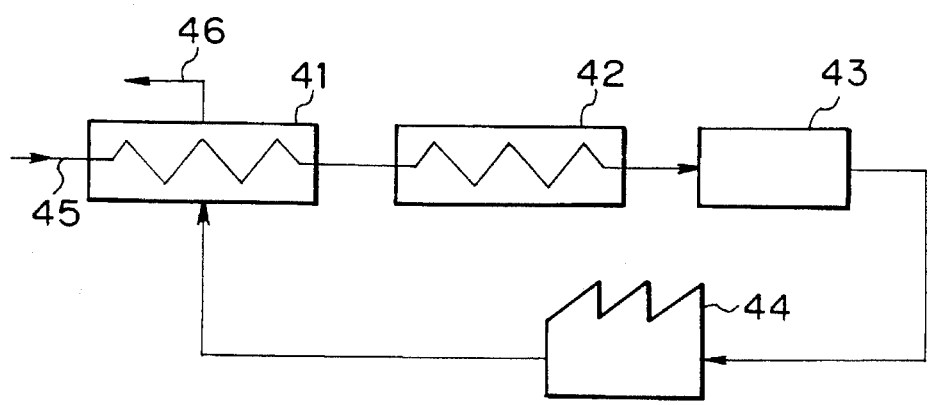
FIG. 10 is a diagram showing the basic arrangement of an ultrapure water producing apparatus according to an eleventh embodiment of the present invention.
Figure 11:
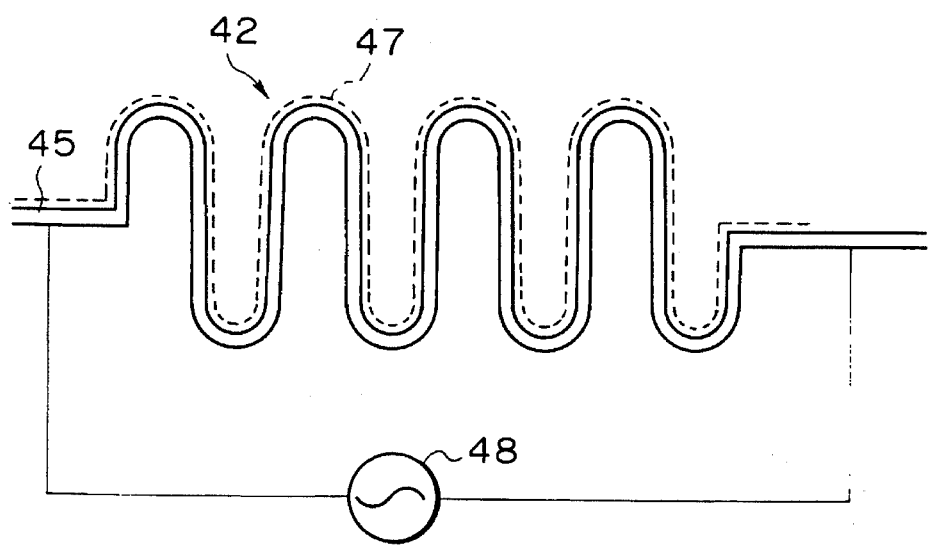
FIG. 11 is an enlarged view of a heat exchanger provided with a heating unit used in the apparatus in FIG. 10.

An embodiment in which the heating unit of the present invention is applied to an ultrapure hot water-producing apparatus is described below. FIG. 10 is a diagram showing the arrangement of an ultrapure hot water-producing apparatus, and FIG. 11 is a sectional view of a heat exchanger used in the apparatus.

In FIG. 10, reference numeral 41 denotes a preheat exchanger; reference numeral 42, a heat exchanger; reference numeral 43, a ultrafilter; reference numeral 44, a use point of ultrapure hot water; reference numeral 45, an ultrapure water supply pipe; reference numeral 46, a discharge pipe; and reference numeral 48, a power source. The heat exchanger 42 comprises the heating unit 47 of the present invention which is provided on the supply pipe, as shown in FIG. 11. The heating unit 47 is the same as that in Embodiment 8 when the supply pipe in the heat exchanger 42 is made of a metal, and a tin oxide film of 1 μm is preferably used as the heating unit when the supply pipe in the heat exchanger 42 is made of quartz glass. Although the material for the supply pipe in the heat exchanger is preferably titanium (Ti), stainless steel or quartz glass, a heat resistant plastic such as Teflon or the like may be used.

[Embodiment 12]

The embodiment concerns a calorifier with an electric load up to about 10 kW which is used in a home gas instantaneous hot-water heater or gas bath.

Figure 12:
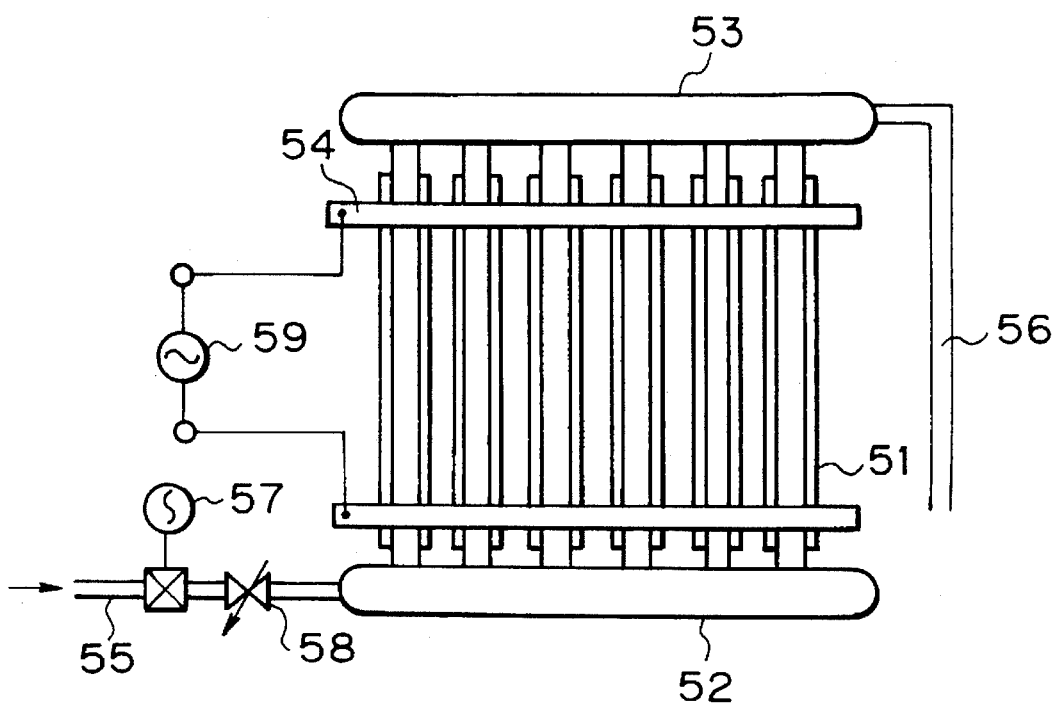
FIG. 12 is a diagram showing a calorifier including a multigroup straight heat transfer pipe according to a twelfth embodiment of the present invention.
Figure 13:
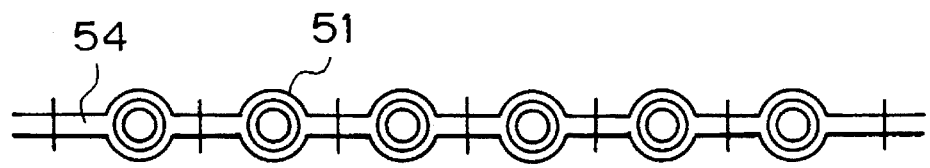
FIG. 13 is a sectional view of the heat transfer pipe shown in FIG. 12.
Figure 14:
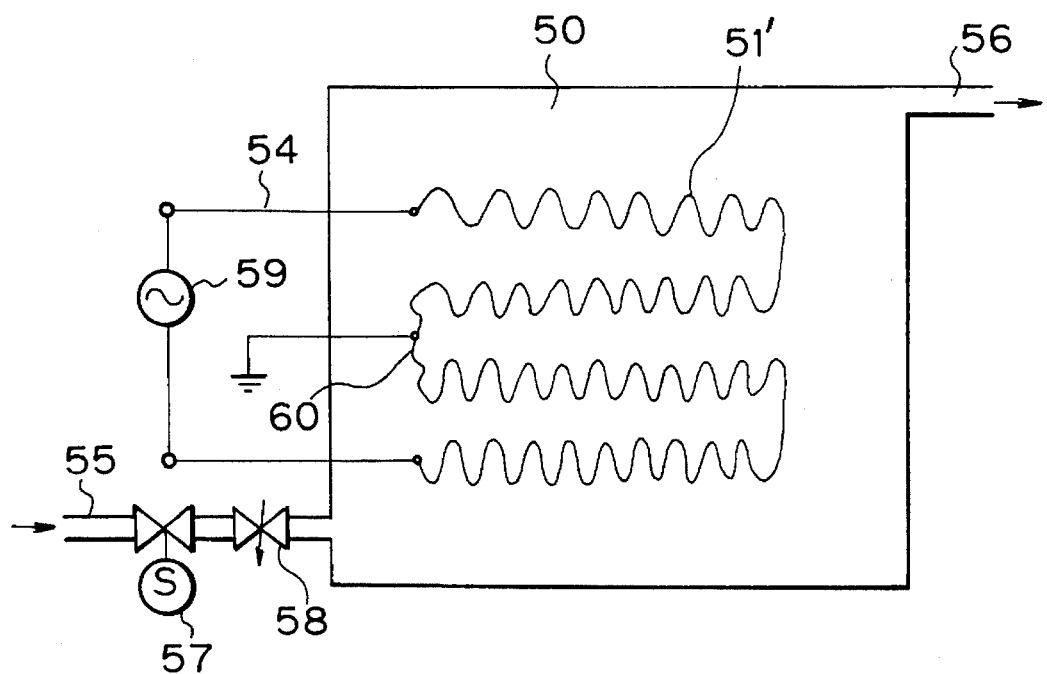
FIG. 14 is a diagram showing a modification of the calorifier shown in FIG. 12.
Figure 15:
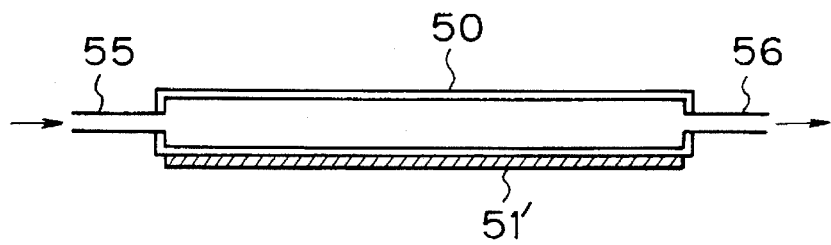
FIG. 15 is a sectional view of the heat transfer box shown in FIG. 14.
Figure 16:
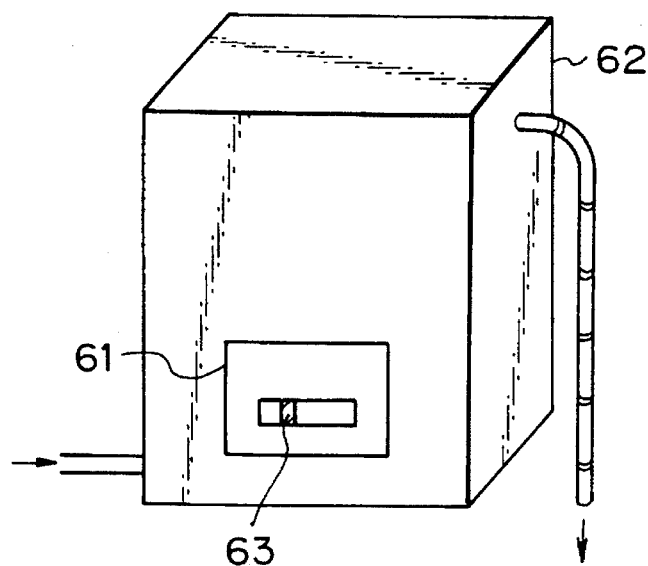
FIG. 16 is an appearance view of the assembly of the calorifier shown in FIG. 12.
Figure 17:
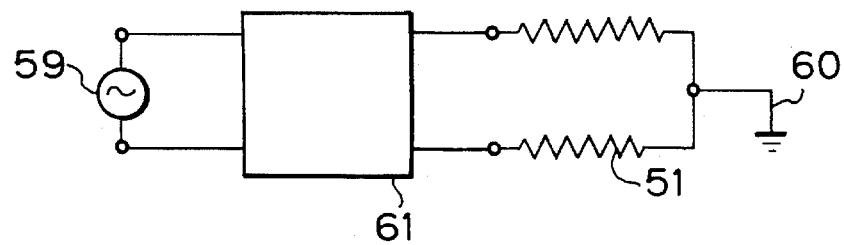
FIG. 17 is a diagram showing the connection between a heating unit and a power controller in the calorifier shown in FIG. 12.
Figure 18:
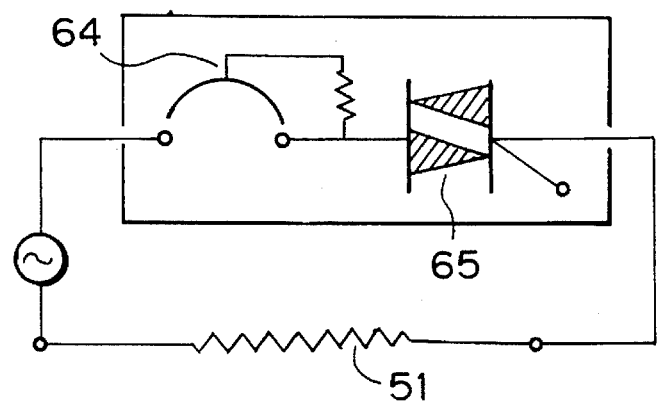
FIG. 18 is a diagram showing the internal connection of a power controller shown in FIG. 17.

FIG. 12 is a diagram showing the construction of the calorifier having metal or glass heat transfer pipes in a form of multigroup straight pipes, and FIG. 13 is a sectional view of the metal or glass heat transfer pipes shown in FIG. 12. Each heat transfer pipe has an NiCr heating layer of 0.1 mm formed as a conductive layer by spray coating. FIG. 13 also shows a mounting relation between heat transfer pipes 51 and electrode 54. FIG. 14 shows a modification of FIG. 12 in which a heating unit 51' (comprising a prime coat (NiCrAlY) having a thickness of 0.05 mm, an insulating layer ($Al_2O_3$) having a thickness of 0.2 mm and a conductive layer (NiCr) having a thickness of 0.10 mm) is formed by thermal sprayed coating on a flat metal heat transfer box 50 having a rectangular sectional area. FIG. 15 is a sectional view of the heating unit 51' and the heat transfer box 50 shown in FIG. 14. FIG. 16 is a sketch showing an appearance of the assembly of the calorifier shown In FIG. 12, FIG. 17 is a drawing showing the connection between the heating unit and an electric power controller, and FIG. 18 is a drawing showing the internal connection of the electric power controller.

The operation of a calorifier is described below with reference to FIG. 12. The calorifier comprises heat transfer pipes 51, a feed water distribution pipe 52, a hot-water supply collecting pipe 53, an electrode 54, a feed water pipe 55, a hot-water supply pipe 56, a solenoid valve 57 for opening and closing hot-water supply, and a control valve 58 for controlling the amount of hot-water supplied. Reference numeral 59 denotes a power source. As shown in FIG. 17, an electric circuit is a single-phase two-wire system, single-phase three-wire system or three-phase three-wire system for electric supply and has a grounding electrode 60. The electric power is controlled by the power controller denoted by reference numeral 61 in FIG. 17, and the electric circuit in the power controller 61 is shown in FIG. 18. In the power controller 61, although the electric power is usually constant, a TRIAC 65 may be provided for controlling the electric power, as in an instantaneous water heater. A short circuit breaker 64 may be provided in the circuit. Water supply may be controlled by controlling the water-supply valve 58.

FIG. 14 shows the case of small electric power in which heat transfer pipes are replaced by a plate like heat transfer unit 51'. The heat transfer unit is basically the same as the heat transfer pipes shown in FIG. 12 and is effective for decreasing the space.

In the embodiments shown a gas-heating calorifier is changed to an electrical-heating calorifier, and thus the operation mechanism is made the same as that in the case of gas heating so that no feeling of discomfort is caused by changing from gas heating to electrical heating.

The embodiments shown are characterized by the absence of a combustion chamber and thus has the effect of decreasing the apparatus size, as compared with gas heating, which effect becomes remarkable as the size increases. The embodiments exhibit a heat transfer efficiency of about 100% and a power factor of 100% in the case using no TRIAC. Since the embodiments have none of the safety problems of gas heating with respect to oxygen deficiency, dioxide gas, gas leakage and so on, they are clean and safe and has no limitation in installation, thus can be used in various fields.

[Embodiment 13]

Figure 19:
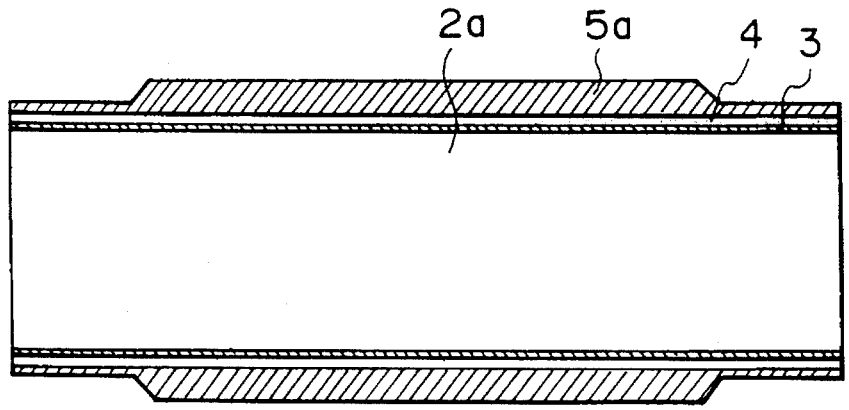
FIG. 19 is a sectional view of an electric furnace provided with a heating unit according to a thirteenth embodiment of the present invention.
Figure 20:
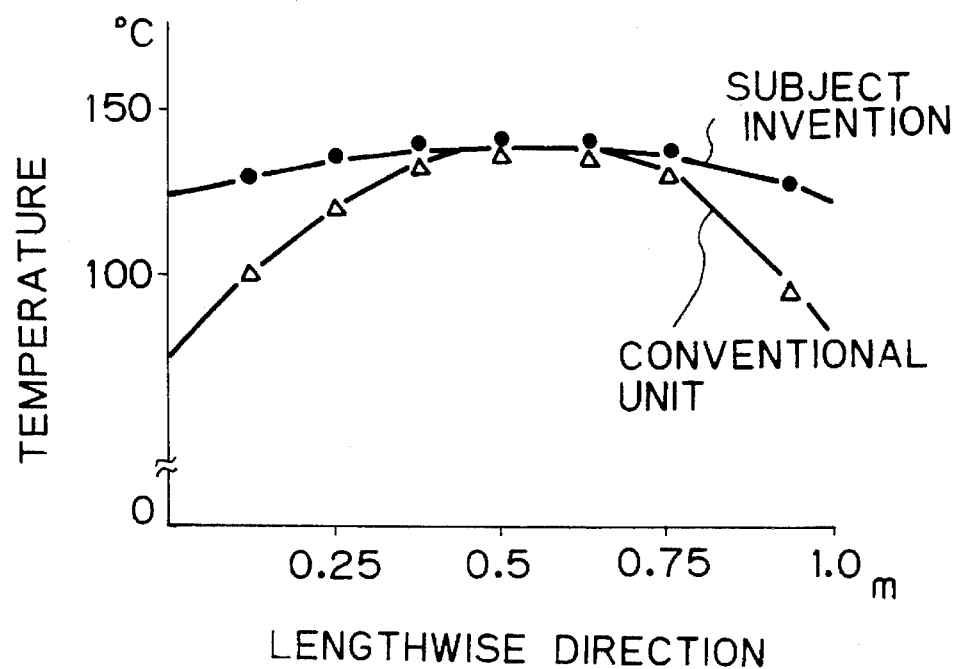
FIG. 20 is a graph showing a heating distribution along the lengthwise of the electric furnace shown in FIG. 19.

FIG. 19 is a drawing showing the arrangement of an electric furnace which employs the heating unit of the present invention and FIG. 20 is a graph showing the temperature distribution thereof. The heating unit comprises a metal pipe 2a and a primary coat 3 (NiAl) of 0.05 mm, an insulating layer ($Al_2O_3$) of 0.2 mm formed over the whole surface, a heating layer 5a (NiCr) formed in a thickness of 0.1 mm on the portions having a length of 20 cm from both ends and a thickness of 0.3 mm on the central portion having a length of 60 cm. The metal pipe 2a is a stainless one shown in FIG. 1. The heat flux was controlled to 0.3 w/cm$^2$ and 0.2 w/cm$^2$ in both end portions and the central portion, respectively. In the pipe (in the case of air), the lengthwise temperature distribution in the central portion was substantially uniform, as compared with a conventional heat transfer pipe.

In summarize, the present invention has the following features:

1) Since the multi-layer film of the heat transfer material is formed by a thin film method, adhesive force between the layers is improved and, therefore, the heat resistance is decreased and a thermal response is increased.

2) Since the heating layer is electrically insulated from a fluid to be heated by the electric insulating layer, the heating material is applicable to fluids of both electrically conductive and nonconductive substances.

3) By providing an electromagnetic shield on the heat insulating layer, an electromotive force produced outside the heating material may be greatly decreased.

4) By subjecting the heat transfer material to a sealing treatment using a resin or the like, high insulation resistance can be maintained even if the material is allowed to stand in air for a long time. It is confirmed that an insulation resistance is kept constant at about 300° C. or less after providing the sealing treatment.

5) By improving the heating properties and the heat insulation properties, high heating efficiency is obtained. Particularly, when the heat transfer material is constituted as a heat transfer pipe and a fluid in the pipe forms a turbulent flow, an increase in the film heat transfer coefficient causes the effect of transferring the Joule heat generated in the multilayer film of a heat transfer pipe on the fluid side only, thereby obtaining a heat efficiency of about 95%.

6) The formation of a gradient film layer results in a relieving of thermal stress and thus improving the durability.

7) By forming heat insulating layer by a thick glass wool or the like, an inexpensive and safe heating material can be provided.

8) The use of the heat transfer pipe or heat transfer plate in a heating apparatus enables the apparatus to be simplified and results in a saving of energy.

9) A heating apparatus comprising the heat transfer material has the effect of preventing environmental pollution.

What is claimed is:

1. A heat transfer pipe for heating a fluid flowing in a pipe as a turbulent flow comprising:

a substrate;

a first electrical insulating layer covering said substrate;

a second electrically conductive layer at least partially covering said first electrically insulating layer, said second electrically conductive layer having a thickness which changes in the lengthwise direction of said substrate at the opposite end portions thereof, such that it is smaller at said opposite end portions than the central portion as to obtain a uniform heating throughout the lengthwise direction of the conductive layer;

a third heat insulating layer covering said second electrically conductive layer; and a fourth electromagnetic shield layer at least partially covering said substrate or said third heat insulating layer, said substrate forming an innermost layer of said pipe, electrically-charging terminals provided on said electrically conductive layer as a second layer, a film heat transfer coefficient inside and outside of said pipe which is so selected that at least 95% of the transferring of the Joule heat generated in said pipe takes place into said fluid inside of said pipe, and wherein each of said layers has a thickness of about 0.1 μm to 3 mm.

2. A heat transfer pipe for heating a fluid flowing in a pipe as a turbulent flow comprising:

a substrate;

an electrically conductive layer as a prime coat at least partially covering said substrate;

a first electrical insulating layer covering the prime coat and substrate a second electrically conductive layer at least partially covering said electrically insulating layer, said second electrically conductive layer having a thickness which changes in the lengthwise direction of said substrate at the opposite end portions thereof, such that it is smaller at said opposite end portions than the central portion as to obtain a uniform heating throughout the lengthwise direction of the conductive layer;

a third heat insulating layer covering said second electrically conductive layer; and a fourth electromagnetic shield layer at least partially covering said substrate, said prime coat or said third heat insulating layer, said substrate forming an innermost layer of said pipe, electrically-charging terminals provided on said electrically conductive layer as a second layer, a film heat transfer coefficient inside and outside of said pipe which is so selected that at least 95% of the transferring of the Joule heat generated in said pipe takes place into said fluid inside of said pipe, and wherein each of said layers has a thickness of about 0.1 μm to 3 mm.

3. A heat transfer pipe for heating a fluid flowing in a pipe as a turbulent flow comprising:

a substrate;

a first electrical insulating layer covering said substrate;

a second electrically conductive layer at least partially covering said first electrically insulating layer, said second electrically conductive layer having a thickness which changes in the lengthwise direction of said substrate at the opposite end portions thereof, such that it is smaller at said opposite end portions than the central portion as to obtain a uniform heating throughout the lengthwise direction of the conductive layer;

a third heat insulating layer covering said second electrically conductive layer; and a fourth electromagnetic shield layer at least partially covering said third heat insulating layer, said substrate forming an innermost layer of said pipe, electrically-charging terminals provided on said electrically conductive layer as a second layer, a film heat transfer coefficient inside and outside of said pipe which is so selected that at least 95% of the transferring of the Joule heat generated in said pipe takes place into said fluid inside of said pipe, and wherein each of said layers has a thickness of about 0.1 μm to 3 mm.

4. A heat transfer pipe for heating a fluid flowing in a pipe as a turbulent flow comprising:

a substrate;

an electrically conductive layer as a prime coat at least partially covering said substrate;

a first electrical insulating layer covering the prime coat and substrate;

a second electrically conductive layer at least partially covering said electrically insulating layer, said second electrically conductive layer having a thickness which changes in the lengthwise direction of said substrate at the opposite end portions thereof such that it is smaller at said opposite end portions than the central portion as to obtain a uniform heating throughout the lengthwise direction of the conductive layer;

a third heat insulating layer covering said second electrically conductive layer; and a fourth electromagnetic shield layer at least partially covering said prime coat, said substrate forming an innermost layer of said pipe, electrically-charging terminals provided on said electrically conductive layer as a second layer, a film heat transfer coefficient inside and outside of said pipe which is so selected that at least 95% of the transferring of the Joule heat generated in said pipe takes place into said fluid inside of said pipe, and wherein each of said layers has a thickness of about 0.1 μm to 3 mm.

5. A heat transfer pipe for heating a fluid flowing in a pipe as a turbulent flow comprising:

a substrate;

an electrically conductive layer as a prime coat at least partially covering said substrate;

a first electrical insulating layer covering the prime coat and substrate;

a second electrically conductive layer at least partially covering said electrically insulating layer, said second electrically conductive layer having a thickness which changes in the lengthwise direction of said substrate at the opposite end portions thereof, such that it is smaller at said opposite end portions than the central portion as to obtain a uniform heating throughout the lengthwise direction of the conductive layer;

a third heat insulating layer covering said second electrically conductive layer; and a fourth electromagnetic shield layer at least partially covering said third heat insulating layer, said substrate forming an innermost layer of said pipe, electrically-charging terminals provided on said electrically conductive layer as a second layer, a film heat transfer coefficient inside and outside of said pipe which is so selected that at least 95% of the transferring of the Joule heat generated in said pipe takes place into said fluid inside of said pipe, and wherein each of said layers has a thickness of about 0.1 μm to 3 mm.

6. A heat transfer pipe for heating according to any one of claims 1, 2, or 3, wherein said second electrically conductive layer is a heating layer formed from a mixture of an electrically conductive material and an electrical insulating material.

7. A heat transfer pipe for heating according to any one of claims 1, 2 or 3, wherein gradient coating layers, respectively made of mixtures containing the materials of adjacent layers at different mixing ratios of 0.1 to 99.9 wt %, are provided between said adjacent layers, said mixtures composed of conductive and insulating materials in such proportions as to allow partial current therethrough and to control the heating thereof so as to minimize thermal stress.

8. A heat transfer pipe for heating according to any one of claims 1, 2, or 3, wherein a porous material layer which is subjected to sealing treatment using a heat resistant resin or ceramic adhesive is included as one of the layers.

9. A heating apparatus comprising a heat transfer pipe of claims 1, 2 or 3 and a heat quantity control mechanism for controlling the amount of electricity charged to said heating unit.

10. A heating apparatus according to claim 9, said heating apparatus is an autoclave, an evaporator, a heat exchanger, a calorifier or a pure water- or ultrapure water-producing apparatus.

11. A heat transfer pipe for heating according to claims 1 or 2 wherein the substrate is a metal.

12. A heat transfer pipe for heating according to claims 1 or 2 wherein the substrate is a nonmetal.

* * * * *